United States Patent [19]

Juell et al.

[11] Patent Number: 4,617,616
[45] Date of Patent: Oct. 14, 1986

[54] AIRPORT RUNWAY LIGHT HOUSING AND METHOD OF INSTALLATION

[76] Inventors: Gaylord E. Juell, 762 East St., North, Suffield, Conn. 06078; Robert E. Lambert, 26 Oakwood St., Enfield, Conn. 06082

[21] Appl. No.: 770,536
[22] Filed: Aug. 28, 1985
[51] Int. Cl.⁴ ............................................. F21V 29/00
[52] U.S. Cl. ....................................... 362/267; 362/145
[58] Field of Search .................................. 362/267, 145

[56] References Cited

U.S. PATENT DOCUMENTS

| | | | |
|---|---|---|---|
| 3,466,435 | 9/1969 | Brunner | 362/267 |
| 3,678,260 | 7/1972 | Beal | 362/267 |
| 4,343,033 | 8/1982 | Suzuki | 362/267 |

FOREIGN PATENT DOCUMENTS

| | | | |
|---|---|---|---|
| 355360 | 8/1961 | Switzerland | 362/267 |
| 559661 | 11/1972 | Switzerland | 362/145 |

Primary Examiner—E. Rollins Cross

[57] ABSTRACT

An aircraft guidance light fixture housing for aircraft runways and taxiways includes a generally cylindrical rotationally molded plastic canister or housing member having an intermediate cylindrical wall section which is of an outer diameter slightly less than the inner diameter of the remaining wall sections of said housing member whereby the housing member may be cut in predetermined spaced apart positions to remove a portion of the housing member and permit telescoping one of the remaining sections into the other remaining section. The overall height of the housing member and the rotational position of one housing section relative to the other may be determined by the cutting and reassembly process. A support ring is mounted on the housing member and includes a peripheral flange of a diameter greater than the housing member so that aircraft loads on the light fixture may be transmitted directly to the runway structure and not through the housing. The housing assembly is installed in a runway structure by predetermining the overall height of the housing, cutting the housing member to provide the predetermined height of the housing assembly, installing the housing with one section rotationally positioned relative to the other in a predetermined position and encapsulating the housing and the support ring by adding runway structure material to secure the housing in a predetermined position.

15 Claims, 4 Drawing Figures

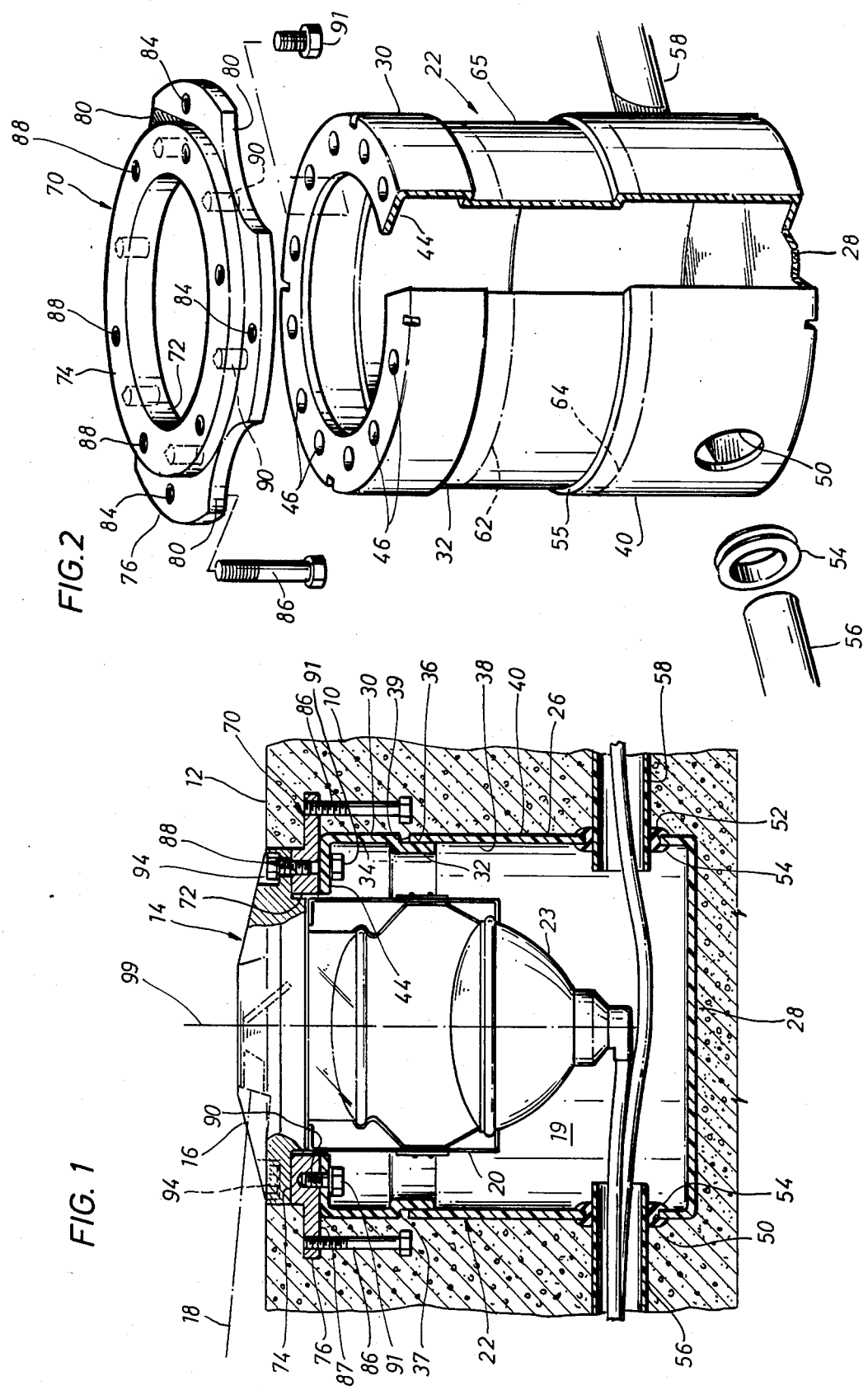

AIRPORT RUNWAY LIGHT HOUSING AND METHOD OF INSTALLATION

BACKGROUND OF THE INVENTION

1. Field of the Invention

The present invention pertains to a runway or taxiway light fixture enclosure or transformer housing of the type which is embedded in the runway surface and a method of installing the light housing in accordance with various thicknesses of runway structure and clearance requirements for the light fixture itself.

2. Background

In the art of runway and taxiway aircraft guidance lights of the type which are typically mounted at ground level or substantially flush with the runway surface, it is often necessary to adjust the enclosure or housing for the light fixture in accordance with the overall thickness of the runway structure. In the case of directional type aircraft guidance lights it is also necessary to be able to adjust the position of the light support structure to provide for aiming the light beam along a specified azimuth.

U.S. Pat. No. 3,678,260 to E. W. Beal and assigned to the assignee of the present invention describes a typical aircraft guidance light of the type wherein the light assembly casing and cover are supported within an outer housing embedded in a concrete or asphalt runway. In the light assembly illustrated in the Beal patent the light fixture cover, which includes the mirror and lens, is arranged to transfer the weight of an aircraft running over the light cover to the concrete reinforcement or to the housing flange in an indeterminate manner. Moreover, in conventional housings heretofore used the flange is not of sufficient diametral extent as to be capable of transferring a substantial part of the weight of the aircraft to the concrete but instead transmits a substantial amount of the aircraft weight to the housing itself which can result in buckling of the housing. Prior art flanges are also of a design which is not particularly suited for preventing the transfer of rotational loads to the housing if an eccentric braking force is exerted by an aircraft tire on the light assembly cover during runover thereof.

Accordingly, there are several features in the provision of an aircraft guidance light housing and support flange arrangement which are desirable and which have not been provided by prior art housings or methods of installation associated therewith.

SUMMARY OF THE INVENTION

The present invention provides an improved base or transformer housing and support flange for an aircraft guidance light, particularly of the type adapted to be disposed at ground level or substantially flush with the surface of an aircraft runway or taxiway. The present invention further provides an improved method of installing a housing in accordance with the invention to provide for the correct height of the light assembly with respect to the runway surface and to permit easy adjustment of the light beam azimuth or directional characteristics.

In accordance with one aspect of the present invention there is provided an aircraft guidance light housing constructed in such a way that the housing may be used for a variety of applications, for enclosing a variety of light assemblies and for use in installations where the runway structures are of various thicknesses. In particular, the housing is desirably made of a molded plastic such as polyethylene or the like and wherein the housing may be easily cut in the field and assembled in such a way that the overall height of the housing for positioning or locating an aircraft guidance light is in accordance with a predetermined dimension, and the housing and a supporting ring or flange for the light fixture may be rotationally placed in a predetermined orientation of the light fixture.

In accordance with another aspect of the present invention the aircraft guidance light housing is made in such a way that a top section of the housing may be slipped in telescoping relationship within a bottom section of the housing after the housing has been cut to remove an intermediate portion. In this way the overall height of the housing can be adjusted in the field without requiring special tools or fabricating equipment. Moreover, after field fabrication or adaptation in accordance with the aforementioned cutting and section removal procedure the top section of the housing can be rotationally adjusted relative to the bottom section so that a light fixture support flange mounted on the top section of the housing may be oriented to provide a predetermined azimuth or bearing for the light beam.

In accordance with still a further aspect of the present invention an aircraft guidance light support structure includes a support ring which projects radially beyond the periphery of a molded cylindrical enclosure or housing and is connected thereto. The housing is installed in a concrete, asphalt, or other runway structure in such a way that aircraft or other vehicle loads imposed on the light fixture are transmitted through the support ring directly to the runway structure itself and aircraft weight or impact loads are not transmitted to the molded housing.

In accordance with yet further advantageous aspects of the present invention the support ring for the light fixture is provided with radially relieved surfaces which, when embedded in concrete or other runway structure material, reduce the tendency for the support ring and light fixture to be rotated due to eccentric rotational forces induced by aircraft braking efforts or conventional land vehicle traction efforts imposed on the light fixture cover. The support ring may also be provided with additional support structure embedded in the runway structure including a plurality of elongated bolts to give further strength to the housing and support ring to resist tearing the support ring out of the runway structure in the event that the light fixture is impacted by a snow plow blade or the like.

The present invention still further provides a method of installing a support housing for an aircraft guidance light fixture or the like wherein the housing may be adjusted as to its overall height and rotationally positioned to provide for orienting the light beam in a predetermined direction upon final assembly of the light fixture to the housing itself. The method utilizes a novel light fixture enclosure or housing and support ring assembly which may be utilized in runways of various thicknesses and in applications wherein runway surfaces are overlaid with additional layers of concrete or other runway surface material.

Those skilled in the art will recognize the above described features and advantages of the present invention as well as other superior aspects thereof upon reading the detailed description which follows in conjunction with the drawing.

BRIEF DESCRIPTION OF THE DRAWING

FIG. 1 is a vertical central section view of the improved aircraft guidance light housing illustrating a light fixture assembly disposed therein;

FIG. 2 is an exploded perspective view of the light fixture support ring and the housing in an uncut condition;

DESCRIPTION OF THE PREFERRED EMBODIMENTS

Figure 3:
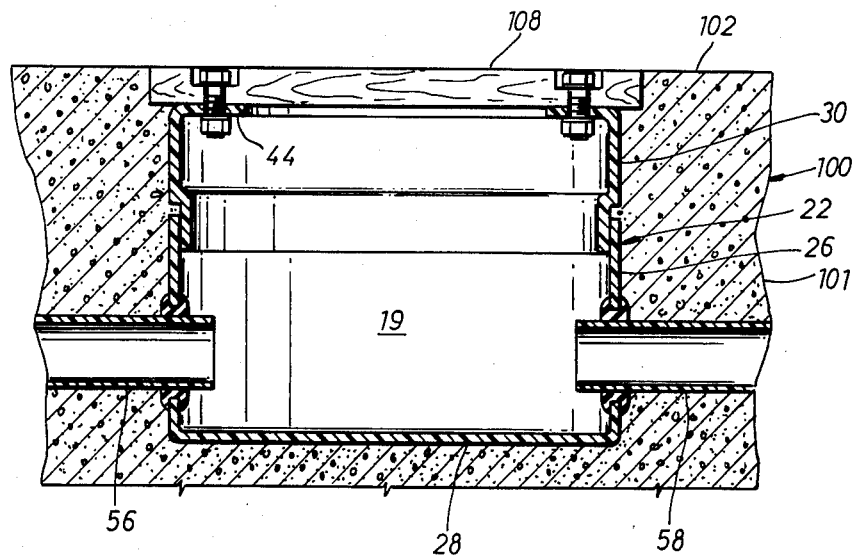
FIG. 3 is a vertical central section view showing the installation of a first light fixture housing in a runway adapted to be constructed with more than one layer.

In the description which follows like parts are marked thoughout the specification and drawing with the same reference numerals, respectively. The drawing figures are not necessarily to scale and certain features may be shown exaggerated in scale in the interest of clarity.

Referring to FIG. 1, there is illustrated a vertical central section view of an aircraft guidance light of the type which is mounted in a runway or taxiway structure along the runway center line, the runway touchdown zone or along the edges or threshold of a runway or taxiway, for example. By way of example only, a runway structure is illustrated which comprises a layer of poured concrete 10 having a generally horizontal aircraft support surface 12 formed thereon. Further by way of example, a light fixture or assembly 14, comprising a runway centerline guidance light, is shown mounted in the runway 10 in such a way that a fixture cover 16 protrudes only slightly above the surface 12 sufficiently to project a beam of light 18 in a predetermined direction along the runway centerline to assist in guiding an aircraft during approach, takeoff and traversal along the runway itself.

The light fixture 14 includes a bracket 20 which is disposed within an enclosure or housing, generally designated by the numeral 22, which is embedded in the runway 10 and provides a clear space 19 for receiving the casing of the light fixture. The bracket 20 typically supports a reflector 23 and other structure associated with generation and projection of the light beam 18. The housing 22 comprises a generally cylindrical bottom section 26 having a transverse bottom wall 28. The housing 22 includes a top section 30 which is also cylindrical and includes a reduced diameter wall portion 32, which is of a wall thickness corresponding to an enlarged diameter portion 34, although the outer surface 36 of the reduced diameter portion 32 is of a diameter slightly less than the diameter of the inner surface 38 of the cylindrical side wall 40 of the lower housing section 26. The wall portions 32 and 34 are joined by a transverse shoulder 37. The top section 30 includes an integral reentrant rim 44 in which a series of spaced apart bolt clearance holes 46 are formed, see FIG. 2 also, in accordance with a predetermined bolt pattern.

As previously mentioned the housing 22 is preferably suitably molded in one piece of a plastic material such as polyethylene or the like and will be described in further detail herein in conjunction with FIG. 2 also. As illustrated in FIG. 1, the lower housing section 26 has been provided with two opposed openings 50 and 52 in which generally annular elastomeric grommets 54 have been inserted and for receiving in substantially sealing relationship electrical conduit sections 56 and 58 providing a wireway for suitable conductor wires leading to and from the light fixture 14. The conduits 56 and 58 are slip fitted into the elastomeric grommets 54 although the openings 50 and 52 may be modified to receive other types of fittings for supporting or terminating conduit sections similar to the sections 56 and 58.

The housing 22 is illustrated in its finished assembled condition in FIG. 1 and is preferably provided as a one piece canister, as illustrated in FIG. 2, wherein the reduced diameter portion 32 is of a predetermined length, is formed integral with the bottom section 26 and is joined thereto through a shoulder 55 in the same manner as the portion 32 is joined to the top section 30. Accordingly, as initially constructed, the housing 22 is preferably a one piece structure which is typically shipped to a work site for installation without being cut so that the overall height of the housing between the bottom wall 28 and the top wall or rim 44 may be selectively predetermined at the time of installation. In this regard, as illustrated in FIG. 2, and by way of example, once the desired overall height of the housing 22 is determined the housing is cut circumferentially, if required, along respective cut lines 62 and 64 to remove a major part of a reduced diameter transition zone or portion 65. The portion 65 initially includes the finally determined reduced diameter portion 32 and part of the portion 65, between the wall 40 of the bottom section and the reduced diameter portion 32, is removed so that the reduced diameter portion 32 may be slipped into the bottom section 26 in telescoping relationship as illustrated in FIG. 1.

When the two sections 26 and 30 of the housing 22 are assembled the annular shoulder 37 formed between the wall portion 34 and the reduced diameter portion 32 may be brought into registration with a transverse surface 39 which is formed on the housing section 26 upon cutting the housing 22 along the cut line 64. However, it is preferred that the shoulder 37 and the surface 39 not be brought into force transmitting registration with each other if a positional relationship can otherwise be held between the rim 44 and the bottom wall 28 during installation of the housing 22 and as long as the portion 32 is telescoped at least partially into the lower section 26. The distance between the cut lines 62 and 64 may also be varied to determine the overall assembled height of the housing as long as a section 32 is provided for interfitting the upper and lower housing sections. The cut lines 62 and 64 can be moved so that a reduced diameter portion using part of the transition section 65 is formed integral with the bottom section 26 and is telescoped into the enlarged diameter portion 34 of the top section 30.

Referring further to FIGS. 1 and 2, the improved light fixture housing 22 includes a support ring for the cover 16 and which is generally designated by the numeral 70. The support ring 70 includes a generally cylindrical opening 72, a transverse top wall 74 and a radially projecting flange portion 76 having an outer diameter which is somewhat greater than the diameter of the housing sections 26 and 30. The flange 76 is provided with circumferentially spaced radially inwardly relieved surfaces 80 forming respective recesses. A plurality of threaded holes 84 are interposed in the flange 76 between the surface 80 for receiving anchor bolts 86, FIG. 1, which depend from a downwardly facing surface 87 of the flange 76.

A second bolt circle defined by a plurality of fastener receiving holes 88 is also formed in the top wall 74 and a third bolt circle defined by a plurality of equally spaced fastener receiving holes 90 is formed in the support ring 70 and opening to the surface 87. The pattern of fastener holes 88 and 90 may be such that the holes are equally spaced from each other and the number of holes may be a total of six holes 88 and a total of six holes 90 whereby a rotational spacing interval of at least 30° may be provided for the light fixture cover 16 with respect to the housing 22. The support ring 70 is secured to the rim 44 by fasteners 91 which project through the holes 46 into the tapped or threaded holes 90.

As illustrated in FIG. 1, the light fixture cover 16 is secured to the support ring 70 by fasteners 94 which are threaded into the holes 88. Typically, the flange 76 is entirely encapsulated by the concrete runway structure and, thanks to the radially projecting flange, vertically downward directed forces, viewing FIG. 1, imposed on the light fixture 14 by the weight of an aircraft wheel passing thereover are transmitted from the cover 16 to the support ring 70 and to the runway structure through the flange 76. Moreover, any tendency to lift the support ring 70 vertically upward due to impacting the light fixture cover 16 by a snow plow blade or the like will be resisted by the flange 76 since it is totally embedded in the concrete runway structure. The anchor rods or bolts 86 also assist in resisting a vertically upward lifting force or tipping force exerted on the fixture 14 and the support ring 70. Accordingly, substantially all forces imposed on the fixture 14 are transmitted through the support ring 70 to the runway 10 and are not imposed on the housing sections 26 or 30. In this regard also, any tendency to rotate the support ring 70 about a vertical central axis 99, FIG. 1, is resisted by the flange 76 due to the recesses which are formed by the surfaces 80 and filled with the runway structure material. Therefore, any rotational loads imposed on the light fixture 14 such as due to braking action of an aircraft tire passing over the light fixture are transmitted through the support ring 70 directly to the runway structure and substantial loading of the housing section 30 is avoided.

Figure 4:
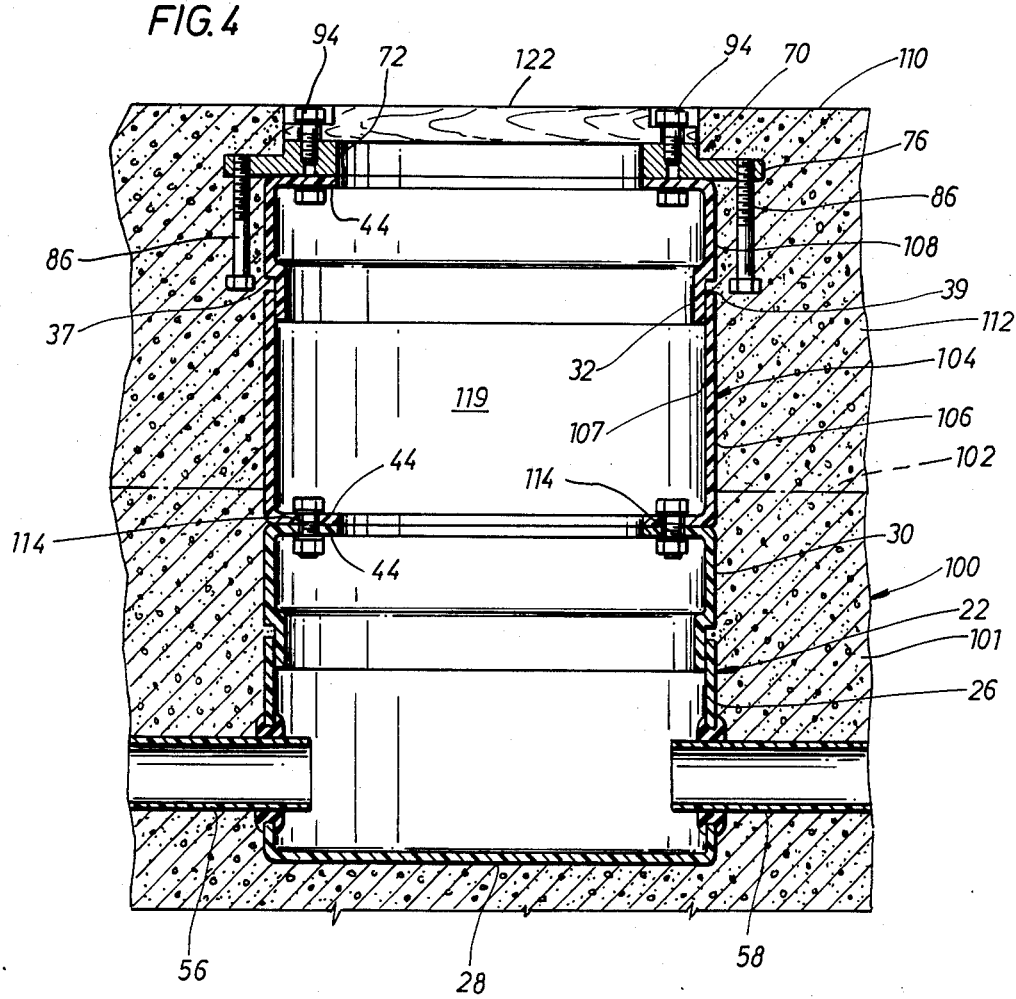
FIG. 4 is a vertical central section view of the second section of the housing and a support ring installed with the first housing section after applying the second layer of runway material.

The improved aircraft guidance light housing and support ring assembly of the present invention is also adapted to be used in installations wherein the required overall height of the housing is greater than the length of an uncut housing member 22 or in installations where a runway or taxiway has been resurfaced by applying an additional layer or layers of concrete or other runway structure material over an existing runway. Referring to FIGS. 3 and 4 by way of example, in FIG. 3 there is illustrated an installation of a cut and reassembled housing 22 which has been embedded in a runway structure 100. The housing 22 could also be an uncut version having the full transition section or portion 65 intact assuming, of course that the thickness of runway 100 required such. The runway 100 may also be the first layer of a multi-layer runway structure. In FIG. 3, in particular, there is illustrated a partially finished runway structure wherein a first layer 101 has been poured around a housing 22 which may have been cut to determine its overall height or left uncut as required by the overall thickness of the runway structure.

The top surface 102 of the runway 100 is prepared for the installation of a second housing, similar to the housing 22, but designated by the numeral 104 in FIG. 4. In preparing a multi-layer runway for the receipt of a second layer of concrete and the receipt of a housing 104, during the preparation of the first layer 101 of runway 100 a removable cover plate 108, FIG. 3 is installed over the top rim 44 of the housing 22 to prevent debris from falling into the space 19. Upon completion of construction of the runway layer 101 the plate 108 is removed and a second housing 104 can be prepared for installation.

The housing 104 may be formed in a selected one of at least two ways by cutting two housings 22 to form respective housing sections 106 and 108. The housing section 106 may be formed, for example, by cutting a housing section similar to the housing section 30 in FIG. 1 above the transition to the reduced diameter portion 32 or, in other words, between the rim 44 and the shoulder 37 so that the housing section 106 has a cylindrical side wall 107 of the same diameter as the enlarged diameter wall 34 of the housing section 30. The housing section 108 is prepared by cutting another housing 22 to form a housing section virtually identical to the housing section 30 but of the requisite length to place a support ring 70 in proximity to the finished runway surface 110 which is finished formed by applying a second layer of concrete, for example, to form a runway section 112. The housings 22 and 104 are, as illustrated in FIG. 4, secured together by fasteners 114 by placing the rim 44 of the housing section 106 adjacent to the rim 44 of the housing 22. Alternatively, the housing 104 may be formed in the same manner as the formation of a housing as illustrated in the FIG. 1 embodiment but modifying the bottom wall 28 to have an opening of the same diameter as athe opening 72 and also providing bolt clearance holes similar to the clearance holes 46 formed in the rim 44. In the installation of the housing illustrated in FIG. 4, a second removable cover plate 122 is preferably installed with removable fasteners 94 to prevent debris from falling into the housing space 119 during construction of the runway layer or section 112.

Accordingly, the housing 22 may be used in several ways alone or in combination with additional housings 22 to construct a light fixture housing having a sufficient depth to accommodate various types of light fixtures and to position the fixture support ring 70 in the desired elevation position with respect to the runway surface as well as in the desired rotational position of the light fixture for orienting or aiming its light beam in a desired azimuth.

Thanks to the provision of the housing 22 as a relatively lightweight plastic structure it may be easily cut in the field at the installation site by conventional hand or power tools without requiring special fabrication techniques after the initial fabrication or molding operation. Those skilled in the art will further appreciate that the use of one or more of the housings 22 in a cut or uncut configuration may be used in conjunction with the construction of runways having one or more layers of runway material. Materials may be used other than concrete such as asphalt, and an asphalt layer may be provided over a concrete layer in either new construction or wherein a concrete layer is provided as an existing base structure. Moreover, the housing and method of the present invention may be used in some instances wherein an asphalt or concrete layer is constructed over an existing relatively shallow base structure having a prexisting recess or no recess for receiving a portion of a light fixture 14 or a portion of a previous light fixture installation.

The overall height of a housing 22 may be varied selectively in accordance with the foregoing description for cutting the housing and installing it in applications where the overall height of the finished installation is less than the height of one uncut housing 22. Moreover, the housing 22 may be provided in selected different overall heights as initially constructed and, of course, in different diameters as required by the various types of light fixtures to be housed thereby. The housing 22 may also be used in non-loadbearing applications without the support ring 70, that is in guidance light installation which would not be subject to runover by an aircraft or other vehicle. In all embodiments illustrated the upper separate section of the housing such as the sections 30 and 108 may be rotationally positioned relative to the respective lower sections in a selected position before encapsulation of the housing by the runway material. Conventional alignment fixtures may be used to position the upper housing sections 30 and 108, for example, before encapsulation.

The preferred methods of installing the housing 22 and 104 are believed to be inherently described above in conjunction with the description of the installations illustrated in FIGS. 1, 3 and 4. However, referring to FIG. 1, for example, in a typical installation of a housing 22 the overall height of the runway 10 is determined and compared with the overall height of an uncut housing 22. If the overall height of the uncut housing plus the height or axial extent of the support ring 70 and the cover 16 require cutting of the housing 22 a cut is made along the cut lines 62 and 64 to provide the requisite height of the housing 22 in its cut form to accommodate the overall height requirements of the installed light fixture assembly as illustrated in FIG. 1. The support ring 70 is then assembled to the housing section 30 and the housing section 30 assembled in telescoping relationship into the housing section 26. The housing section 26 may be previously placed in its predetermined position and connected to the conduit sections 56 and 58. The overall height of the housing 22 including the support ring 70 may then be determined by adjusting the position of the housing section 30 relative to the housing section 26. As mentioned previously, at least a slight clearance should be provided between the shoulder 37 and the surface 39. The exact axial position and rotational position of the support ring 70 and housing section 30 may be provided by a suitable locating jig or fixture. Once the position of the housing section 26 and the housing section 30 are determined the runway material is poured or otherwise applied to encapsulate the housing and support ring assembly. The application of runway material may be accomplished in stages such as, if pouring concrete, pouring enough concrete to anchor the housing section 26 and then making any final adjustments in the exact position of the support ring 70 and housing section 30 by axially moving this assembly relative to the housing section 26 and also rotationally positioning the assembly of the housing section 30 and the support ring 70 relative to the housing section 26. The remaining concrete may then be poured to completely encapsulate the housing and support ring assembly.

The installation of the housing assembly illustrated in FIGS. 3 and 4 may be carried out in substantially the same manner as described above for the housing installation illustrated in conjunction with FIG. 1 with the exception that two positional measurements are taken, one each for the housing 22 and the housing 104 so that a final position of the support ring relative to the runway surface 110 may be provided. Those skilled in the art will recognize that the basic method of installing the housings 22 and 104 may be carried out in existing runway structures by drilling or excavating a hole in an existing runway of sufficient diameter to receive a housing 22 and/or a housing 104 and also providing sufficient space around the housing to apply filler or encapsulating material between the existing runway structure and the abovementioned clearance hole. After the housing is fabricated in accordance with the method of the present invention and installed with a suitable jig or fixture to position it relative to the finished working surface of the runway, the abovementioned material is added into the clearance hole or excavation to encapsulate the housing as with new runway construction.

Although preferred embodiments of the present invention have been described herein in detail those skilled in the art will recognize that various substitutions and modifications may be made to the specific embodiments described without departing from the scope and spirit of the invention as recited in the appended claims.

What is claimed is:

1. A housing for enclosing at least a portion of an aircraft guidance light fixture whereby said light fixture may be disposed in a predetermined position relative to the surface of a runway structure and oriented in a predetermined direction for guidance of aircraft relative to said runway structure, said housing comprising a generally cylindrical canister having a bottom wall and a top wall including an annular rim defining an opening into an interior space of said housing, said housing including a first section having a generally cylindrical side wall having an inner surface of a first diameter; and a second section of said housing having a generally cylindrical side wall having an outer surface of a second diameter and configured in such a way that said housing may be cut to separate said first section from said second section to shorten the distance between said bottom wall and said annular rim and whereby said first and second sections may be reassembled with the side wall of one of said sections being telescoped within the side wall of the other of said sections so that the overall height of said housing may be predetermined and the two sections may be rotated relative to each other to orient said light fixture in a predetermined direction.

2. The housing set forth in claim 1, wherein:
said first section and said second section each include a cylindrical side wall portion of the same diameter and said first section and said second section are interconnected by a section having a cylindrical side wall of an outer diameter at least slightly less than the inner diameter of the first cylindrical side wall, said cylindrical side walls being integrally joined to each other prior to removal of a portion of one of said sections.

3. The housing set forth in claim 2, wherein:
said housing is formed of molded plastic.

4. The housing set forth in claim 1, including:
a support ring for securing said light fixture to said housing including a generally cylindrical member having a hub portion formed to have a plurality of fastener receiving holes which are arranged to be aligned with corresponding fastener receiving holes in said annular rim, and a radially projecting flange portion extending radially outwardly beyond the outer surface of said cylindrical side walls of said housing for transferring aircraft induced loads from said light fixture directly to said runway structure through said support ring to prevent imposing substantial loads on said side wall portions of said housing.

5. The housing set forth in claim 4, wherein:
said support ring includes radially inwardly relieved surfaces forming circumferentaily spaced recesses in said flange for receiving runway structure material and for transferring rotationally induced forces on said support ring directly to said runway structure.

6. The housing set forth in claim 4, wherein:
said support ring includes a plurality of circumferentailly spaced axially depending anchor members embedded in said runway structure for resisting overturning forces imposed on said support ring.

7. A housing assembly for supporting and enclosing at least a portion of an aircraft guidance light fixture which is to be mounted substantially flush with the surface of an aircraft runway or taxiway structure, said housing assembly comprising:
a generally cylindrical housing member including a first section having a cylindrical side wall, and a second section having a cylindrical side wall dimensioned to be telescopically interfitted within said first section whereby the overall height of said housing member and the rotational position of said first section relative to said second section may be selected; and
a support ring for said light fixture including a generally cylindrical ring member having a hub portion adapted to be secured to said housing member with releasable fastener means and a peripheral flange of said support ring having an outer diameter greater than the diameter of said housing sections whereby said housing assembly may be embedded in said runway structure and aircraft loads imposed on said light fixture may be transferred through said support ring and directly to said runway structure without tending to collapse said housing member.

8. The housing assembly set forth in claim 7, wherein:
said first section and said second section each include a first cylindrical side wall portion of the same diameter and said first section and said second section are interconnected by a section having a cylindrical side wall of an outer diameter at least slightly less than the inner diameter of said first cylindrical side wall portions, said cylindrical side walls being integrally joined to each other prior to removal of a portion of one of said sections to form said first and second sections, respectively.

9. The housing assembly set forth in claim 7, wherein:
said housing is formed of molded plastic.

10. The housing assembly set forth in claim 7, wherein:
said support ring includes radially inwardly relieved surfaces forming circumferentially spaced recesses in said flange for receiving runway structure material and for transferring rotationally induced forces on said support ring directly to said runway structure.

11. A method for installing an aircraft guidance light fixture of a type which is intended to give directional guidance to an aircraft approaching a runway or traversing said runway comprising the steps of:
providing a light fixture housing for enclosing at least a portion of said light fixture, said housing including a first section and a second section, said sections being integrally joined one to the other and being configured such that, if separated by cutting said housing, said sections may be rejoined in telescoped relationship one to the other and rotationally positioned one relative to the other;
determining the overall required height of said housing and cutting said housing to remove an intermediate portion of said housing;
positioning one of said sections relative to the other of said sections to form an enclosure and to determine the overall height of said housing, and rotationally positioning one of said sections relative to the other section so that said light fixture may be aimed along a predetermined azimuth; and
adding material to said runway to substantially encapsulate said housing for securing said housing in said runway.

12. The method set forth in claim 11, including the step of:
providing a support ring including a generally cylindrical flange having a diameter greater than the diameter of said housing;
securing said support ring to one of said sections; and
encapsulating said support ring at least partially in said runway such that loads imposed on said support ring by a light fixture secured to said support ring are transmitted to said runway.

13. The method set forth in claim 12, wherein:
the step of encapsulating said support ring is preceded by a step of positioning said support ring and said one housing section rotationally and axially relative to said other housing section in a predetermined position.

14. The method set forth in claim 12, including the step of:
providing anchor means for said support ring operable to resist overturning said support ring.

15. A method for installing an aircraft guidance light fixture of a type which is intended to give directional guidance to an aircraft approaching a runway or traversing said runway comprising the steps of:
providing a light fixture housing for enclosing at least a portion of said light fixture and for securing said light fixture in said enclosure, said housing including a generally cylindrical member having a bottom wall and an opposite end formed by an annular rim, and said housing further including a first section and a second section integrally joined one to the other and being configured such that if separated by selective cutting of said housing between said bottom wall and said rim said sections may be rejoined in telescoped relationship one to the other and rotationally positioned one relative to the other;
providing a support ring of said housing including a generally cylindrical flange portion extending radially outwardly beyond the diameter of said rim;
determining the overall required height of said housing and cutting said housing to remove a portion of said housing between said bottom wall and said rim so that the height of said housing conformed to said predetermined height;

connecting one of said housing sections to said support ring at said rim;

positioning one of said sections relative to the other of said sections to determine the overall height of said housing and rotationally positioning one of said sections relative to the other section so that said light fixture may be aimed along a predetermined azimuth when secured to said support ring; and adding material to said runway structure to substantially encapsulate said housing and provide a surface contiguous with said support ring for securing said housing assembly in said runway structure and for transferring vehicle induced loads on said light fixture through said support ring to said runway structure.

* * * * *